United States Patent [19]

Coble

[11] 4,014,564
[45] Mar. 29, 1977

[54] VEHICLE STABILIZING APPARATUS

[75] Inventor: Ralph A. Coble, San Diego, Calif.

[73] Assignee: Coble Incorporated, San Francisco, Calif.

[22] Filed: Oct. 16, 1975

[21] Appl. No.: 623,057

[52] U.S. Cl. .............................................. 280/689
[51] Int. Cl.² ........................................ B60G 19/02
[58] Field of Search ............. 280/104, 689, 112 A; 267/20 A

[56] References Cited
UNITED STATES PATENTS 1,703,323  2/1929  Sanford ............................. 280/104

Primary Examiner—Philip Goodman
Attorney, Agent, or Firm—Frank D. Gilliam

[57] ABSTRACT

A vehicle includes a spaced apart sprung and unsprung portion with suspension and vertical dampening connected therebetween. A first pair of link members are pivotly attached to the sprung portion in a laterally spaced apart relationship and second pair of link members are pivotly connected to the unsprung portion. Each link of the first pair of link members is pivotly connected to one link of the second pair of link members at their ends opposite their respective sprung and unsprung portion attachment by a common link pin. A rod is fixedly attached at each of its ends to one of the link pins and is substantially parallel with said sprung and unsprung portions. The first link members are parallel and the second link members are parallel and equal angles are formed between the first and second links at their joinders.

5 Claims, 6 Drawing Figures

U.S. Patent   Mar. 29, 1977   4,014,564
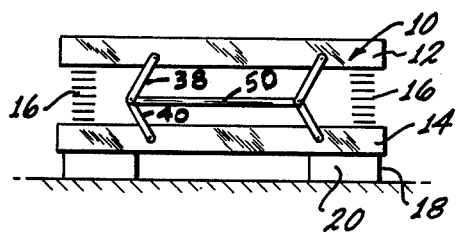
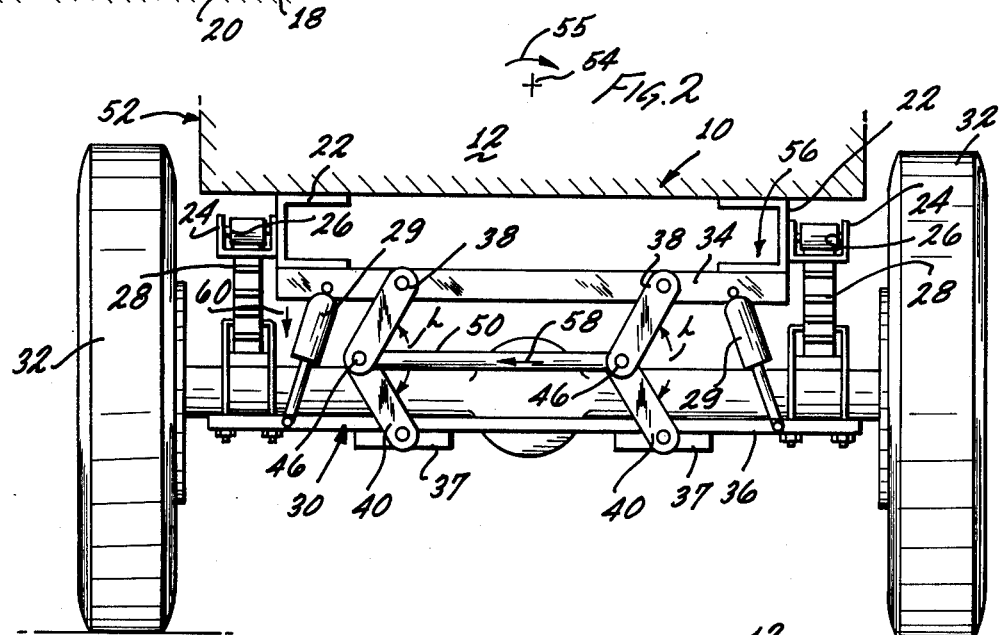
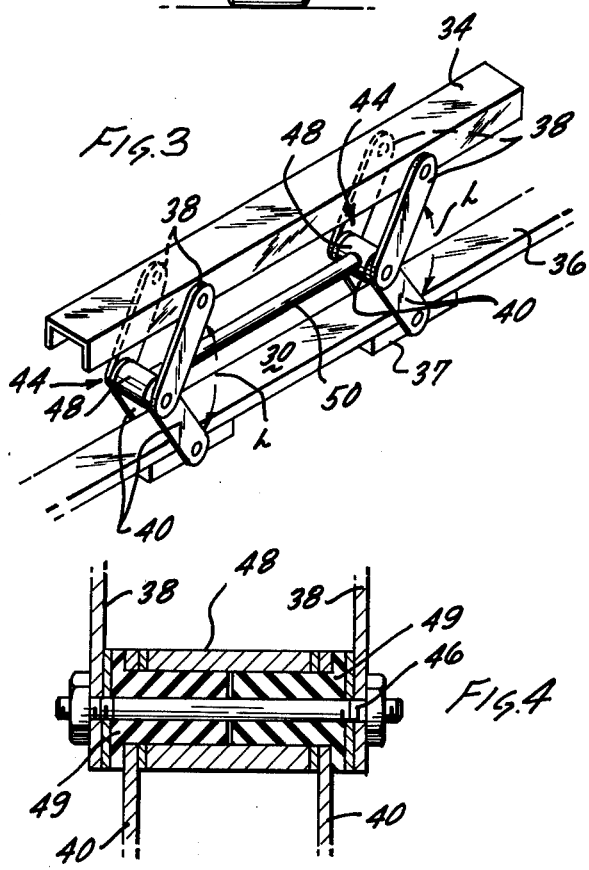
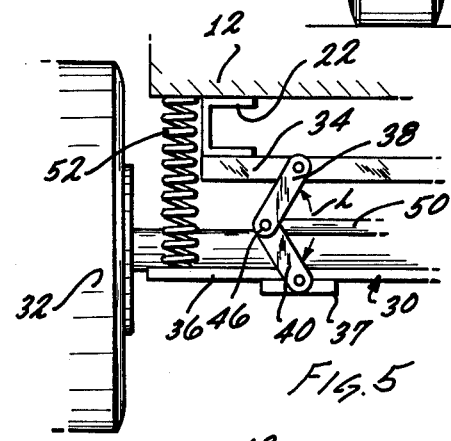
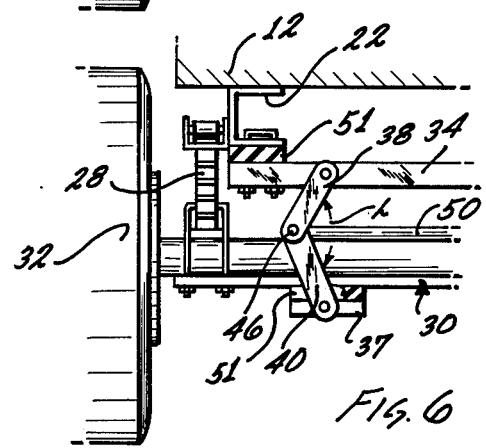

VEHICLE STABILIZING APPARATUS

BACKGROUND OF THE INVENTION

The present invention relates to suspension control of a surface supported vehicle and more particularly to a means of controlling the lateral stability of the sprung portion of a vehicle.

It has been a continuing problem to provide lateral stability to a vehicle particularly a surface supported vehicle, as for example, a truck having a large body structure for transporting heavy loads a great distance where the center of gravity of the loads are high providing a certain degree of unstability when cornering or encountering uneven side loading from wind and the like. In recent years, it has become very important to improve the stability of large pleasure vehicles, such as, house cars, motor homes, trailers, pickup mounted campers and the like. It is particularly important to improve the lateral stability of pleasure vehicles for passenger safety and to compensate for the inexperience of occasional operators of these vehicles.

Generally improvements in lateral stability have been accomplished by increasing the stiffness of the suspension medium. This solution increases the weight of the vehicle and provides a hard ride to the passengers riding therein.

Front mounted body to camper shock absorbers have met with limited success. They help in removing the vertical bounce or up and down motion between the truck and camper unit; however, they are but a minimum aid in improving lateral stability.

A device that would provide a vehicle with substantially complete lateral control, is light in weight, inexpensive to construct and free from maintenance would be highly desirable and find a waiting market.

The present invention is effective in controlling the lateral stability of any vehicle having a sprung and unsprung portion.

SUMMARY OF THE INVENTION

The invention is characterized by two pairs of first links pivotly attached to the sprung body portion and spaced apart transversely to the direction of travel of the vehicle. Two pairs of second links are pivotly attached to the unsprung portion, for example, the axle housing of a road vehicle, adjacent the two pairs of first links. A pair of first and second links are pivotly attached at their ends opposite their respective sprung and unsprung attachment end to a common pivot pin. The pivot pin on each coupled pair of first and second links is interconnected by a rigid member fixedly attached to one of the pins at each of its ends. The first links are parallel to each other, the second links are parallel to each other and the first and second links form an angle therebetween. Any lateral forces applied to either of the two first and second link combinations will be transmitted via the rigid member to the other first and second link combination resulting in an equal angle change between the pairs of first and second link combinations thereby maintaining an equal vertical displacement of the sprung portion relative to the unsprung portion effectively cancelling the lateral instability of the sprung portion due to unequal side forces acting on the sprung portion of the vehicle.

The mechanism is simple, light in weight and provides for effective lateral stability control.

The above and other features of the instant invention will be readily apparent as the description continues while being read in conjunction with the appended drawings.

DESCRIPTION OF THE DRAWINGS

FIG. 1 is a schematic showing of the stabilizing mechanism of the invention.

FIG. 2 is an end view showing of the instant invention as applied to a vehicle having a wheel/axle unsprung portion and conventional longitudinal leaf springs suspension and hydraulic dampening.

FIG. 3 is a perspective showing of the mechanism of the instant invention.

FIG. 4 is a cutaway end view of a typical bushing utilized at the joinder of the sprung and unsprung attached links.

FIG. 5 is a partial end view of a vehicle having coil sprung suspension.

FIG. 6 is a partial showing of FIG. 2 with resilient means positioned between sprung link connection and the sprung portion.

DETAILED DESCRIPTION OF THE PREFERRED EMBODIMENT

The same reference numerals are used through the description to denote the same element or part.

According to FIG. 1, a schematic showing of the instant invention is shown. A transverse sprung portion 12 of a vehicle 10 is shown superposed over the vehicle unsprung portion 14. Suspension and dampening means 16 is shown. The suspension and dampening means may take many forms, as hereinafter discussed. A surface supporting element 18 is shown having contact with supporting surface 20. The element may take the form of wheels, air cushion, magnets, and the like. This invention is not to be limited by the surface contacting unsprung portion supporting means.

The structure herein described is not limited to use with vehicles utilizing axle/wheel combinations but may also be used with various other support medium as described above. It is merely desired to frame this invention in a representative environment for ease, explanation and understanding.

Referring now to FIG. 2, the rear portion of the wheel supported vehicle 10 is shown. The vehicle comprises a sprung body or load carrying portion 12 positioned above and supported by longitudinal "U" frame members 22 attached in a conventional manner at their outer U surface to spring shackle 24. The spring shackle 24 is pivotly connected through pivot pin 26 to leaf springs 28. The leaf springs are conventional and are installed in a conventional manner. Shock absorbers 29 are shown and are installed in a conventional manner. Shock absorbers 29 may be any static or dynamic type fluid shock absorber, an example being the common hydraulic type. An axle 30 is shown supporting a pair of spaced apart conventional vehicle wheels 32. The springs 28 are attached to the axle 30 at their appropriate locations in a conventional manner.

Referring now to FIGS. 2 and 3, an upper support member 34 is attached between the U frame members 22 in a conventional and well known manner, such as, but not limited to, welding, bolting, etc. A lower support member 36 is likewise attached to the unsprung axle 30.

Attached between the upper and lower support members 34, 36 respectfully are two spaced apart upper and lower link combinations 38, 40 respectfully. The upper link combinations 38 each include a pair of identical links pivotly mounted on either side of upper support member 34. The identical links of each combination are parallel and the pair of link combinations 38 are parallel to each other thereby forming the same angle with the upper support member 34. The lower link combinations 40 each include, like 38, a pair of identical links pivotly mounted on either side of lower support member 36, bracket 36 having a slightly smaller width dimension than upper support member 34. The links, like for the combination 38, are identical and each link of each combination are parallel to each other thereby forming the same angle with lower support member 36. The pivot mounting of the links, not shown, can be of any conventional manner. The support member 34, 36 may be constructed of any suitable material capable of supporting the required loads encountered. The upper and lower link combinations 38, 40 respectively are pivotly interconnected at their ends opposite their respective sprung, unsprung attachment point. In the various drawings, the lower links are shown nested between the upper links at their pivoted connection 44. It should be obvious that either link could be inside or outside of the plane of the attaching link to satisfactorily practice the invention.

The upper and lower links pivot about a common pivot pin 46, clearly shown in FIG. 4, and from an equal angle L therebetween. The upper and lower links are held in a spaced relationship by a tubular bushing 48. A tubular resilient spacing member 49 is force fitted between the pin 46 and the inner surface of bushing 48. This spacing member 49 provides vibration absorption as well as additional vertical dampening between the sprung and unsprung members. Between the two bushings and fixedly attached thereto is a rigid transverse member 50, such as a rod, bar or the like made from suitable material, such as, steel or the like having sufficient strength to maintain rigidity.

Coil springs 52, see FIG. 5, may be utilized equally as well to practice the invention as would leaf springs or any other conventional suspension medium.

In applications where considerable vibration would be transferred between the unsprung portion and the sprung portion, through the connections of the link combinations, a flat resilient spacing member 54, see FIG. 5, may be inserted between the upper support member 34 and the U frame members 22. A similar member 54 may be inserted between 36 and 37 as well for the same purpose.

Equal angles L between the upper and lower links may be of any angle between approximately 10° and 170°. Ideally, the angle will be approximately 90° to enable maximum vertical downward or upward displacement of the sprung portion with respect to the unsprung portion.

Mounting blocks 37, to give increased thickness to bracket 36, are shown attached to the lower support bracket 36. The block 37 is actually a portion of bracket 36 and both 36 and 37 should be considered as the lower support bracket.

OPERATION OF THE PREFERRED EMBODIMENT

The operation of the stabilizing apparatus is simple to understand and should be obvious from the various figures read with the above specification. A short simple explanation follows.

Assume a lateral force in the direction of arrow 52 is applied to the sprung body of the vehicle. The force along arrow 52 causes the body to rotate about its vertical center 54 in a direction of arrow 55 and forces the upper support bracket to move downward along the direction of arrow 56, causing the angle L to decrease, move transverse member 50 along the direction of arrow 58 toward the direction of arrow 52. The movement of member 50 causes the angle L between the opposite link combinations to decrease in a like manner causing the end of support bracket 34, nearest the arrow head 52, to move toward the lower bracket 36, shown by arrow 60, the same amount as the opposite side, thus maintaining an equal spaced relationship between the upper and lower support members thereby preventing any effective lateral movement of the sprung portion. It should be clear the lateral forces on the opposite side of the sprung portion would be controlled in the same manner.

It has been seen that the stabilizing apparatus embodying the present invention is characterized by a simple mechanism that controls substantially all of the lateral movement of the sprung portion of a vehicle encountering side loading. The ride characteristics of the vehicle employing the instant invention are not changed by the addition of the stabilizing mechanism.

Many changes may be made in details and materials of fabrication, in the configuration and assemblage of the constituent elements, without departing from the spirit and scope of the appended claims, which changes are intended to be embraced therewithin.

Having thus described the invention, what is claimed as new and useful and desired to be secured by United States Letters Patent is:

1. Improved lateral stabilizing apparatus for a surface supported vehicle having a sprung frame and body portion attached thereto and an unsprung wheel and axle surface contacting portions comprising:
   an upper support bar attached to said frame transversely thereof,
   a lower support bar attached to said axle parallel to said first bar,
   suspension and vertical dampening means connected between said sprung and unsprung portions,
   two upper pairs of links connected to the upper bar, the pairs being spaced along the bar,
   the links of each pair being parallel and pivotally connected to the respective forward and rearward sides of the bar,
   two lower pairs of links connected to the lower bar, the lower pairs being spaced along the lower bar,
   the links of each lower pair being parallel and pivotally connected to the respective forward and rearward sides of the lower bar,
   a pivot pin connected between the parallel links of each pair of one of the upper and lower pairs,
   a resilient bushing surrounding each of said pivot pins and extending between the links connected thereby,
   a rigid bushing about each of said resilient bushing,
   said resilient bushing being pivotally mounted in openings in the parallel links of the other of the upper and lower pairs respectively,
   and a rigid member securing the rigid bushings together,
   the pivotally connected upper and lower links of all the pairs forming equal included angles between them.

2. The invention as defined in claim 1, wherein said angles are approximately ninety degrees.

3. The invention as defined in claim 1, wherein a resilient spacer is positioned between said frame and the upper support bar.

4. The invention as defined in claim 1, wherein a resilient spacer is positioned between said axle and the lower support bar.

5. The invention as defined in claim 1, wherein a resilient spacer is respectively positioned between said frame and said upper support bar and said axle and said lower support bar.

* * * * *